United States Patent
Lin

(10) Patent No.: US 9,128,643 B2
(45) Date of Patent: Sep. 8, 2015

(54) METHOD AND APPARATUS PERFORMING CLOCK EXTRACTION UTILIZING EDGE ANALYSIS UPON A TRAINING SEQUENCE EQUALIZATION PATTERN

(71) Applicant: Silicon Motion Inc., Hsinchu County (TW)

(72) Inventor: Ying-Chen Lin, New Taipei (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 288 days.

(21) Appl. No.: 13/896,343

(22) Filed: May 17, 2013

(65) Prior Publication Data

US 2013/0311813 A1 Nov. 21, 2013

Related U.S. Application Data

(60) Provisional application No. 61/648,085, filed on May 17, 2012.

(30) Foreign Application Priority Data

Apr. 25, 2013 (TW) .............................. 102114881 A

(51) Int. Cl.
*G06F 1/12* (2006.01)
*H04L 7/033* (2006.01)
*H04L 7/04* (2006.01)

(52) U.S. Cl.
CPC *G06F 1/12* (2013.01); *H04L 7/033* (2013.01); *H04L 7/042* (2013.01)

(58) Field of Classification Search
CPC ....................................................... G06F 1/12
USPC .......................................................... 713/400
See application file for complete search history.

(56) References Cited

U.S. PATENT DOCUMENTS

| 4,926,447 | A | * | 5/1990 | Corsetto et al. ................ 375/376 |
| 5,185,768 | A | * | 2/1993 | Ferraiolo et al. .............. 375/373 |
| 5,898,666 | A | * | 4/1999 | Fukuda .......................... 370/280 |
| 5,969,559 | A | * | 10/1999 | Schwartz ....................... 327/295 |
| 6,570,912 | B1 | | 5/2003 | Mirfakhraei |
| 7,321,647 | B2 | * | 1/2008 | Matsuura ...................... 375/355 |
| 8,427,219 | B1 | * | 4/2013 | Wu et al. ......................... 327/291 |
| 8,477,834 | B2 | * | 7/2013 | Leibowitz et al. ............. 375/233 |
| 2009/0167402 | A1 | | 7/2009 | Tian |

FOREIGN PATENT DOCUMENTS

TW 200502844 1/2005

* cited by examiner

*Primary Examiner* — Suresh Suryawanshi
(74) *Attorney, Agent, or Firm* — Winston Hsu; Scott Margo

(57) ABSTRACT

A method and apparatus for performing clock extraction are provided. The method includes: performing edge analysis on a Training Sequence Equalization (TSEQ) pattern carried by a set of received signals that are received from a Universal Serial Bus (USB) port of an electronic device, to dynamically generate a plurality of analysis results; and performing frequency calibration on a frequency of an output clock of a Numerically Controlled Oscillator (NCO) according to a frequency that different types of analysis results within the plurality of analysis results alternatively occur, to utilize the output clock as a reference clock after completing the frequency calibration. More particularly, the method further includes: generating a set of de-multiplexed signals respectively corresponding to a plurality of bits, to perform the edge analysis by comparing respective voltage levels of de-multiplexed signals corresponding to every two adjacent bits of the plurality of bits within the set of de-multiplexed signals.

20 Claims, 6 Drawing Sheets

P_TSEQ

```
0011111010 0101001110 0001011011 0110000110
0010111011 0100111010 0001110001 1011010100
1011010010 0100111100 0111001100 1110011001
0110011010 1000011010 1011001100 1010111010

0101010101 0101010101 0101010101 0101010101
0101010101 0101010101 0101010101 0101010101
0101010101 0101010101 0101010101 0101010101
0101010101 0101010101 0101010101 0101010101

1100000101 1010110001 1110100100 1001110110
0010110100 0100111010 1110001110 0100101011
0100101101 0100110011 0111000011 0001101001
0110011010 0111101010 1011000011 0101001010

0101010101 0101010101 0101010101 0101010101
0101010101 0101010101 0101010101 0101010101
0101010101 0101010101 0101010101 0101010101
0101010101 0101010101 0101010101 0101010101

0011111010 0101001110 0001011011 0110000110
0010111011 0100111010 0001110001 1011010100
1011010010 0100111100 0111001100 1110011001
0110011010 1000011010 1011001100 1010111010

0101010101 0101010101 0101010101 0101010101
0101010101 0101010101 0101010101 0101010101
0101010101 0101010101 0101010101 0101010101
0101010101 0101010101 0101010101 0101010101
```

Edge_No 20
22
20
26

39
39
39
39

21
23
23
26

39
39
39
39

20
22
20
26

39
39
39
39

Estimating → Determining edge densities →

Edge_Density

METHOD AND APPARATUS PERFORMING CLOCK EXTRACTION UTILIZING EDGE ANALYSIS UPON A TRAINING SEQUENCE EQUALIZATION PATTERN

CROSS REFERENCE TO RELATED APPLICATIONS

This application claims the benefit of U.S. provisional application No. 61/648,085, filed on May 17, 2012 and incorporated herein by reference.

BACKGROUND OF THE INVENTION

1. Field of the Invention

The disclosed embodiments of the present invention relate to control of Universal Serial Bus (USB) 3.0 electronic devices, and more particularly, to a method for performing clock extraction and related apparatus thereof.

2. Description of the Prior Art

A portable electronic device (such as a flash disk, an external hard drive, a memory card reader complying with one or more standards) equipped with a Universal Serial Bus (USB) provides sufficient convenience for users. The market has many associated products available to the users in response to user demands.

In accordance with the related art, in a condition where some types of oscillators need to be set up in the portable electronic devices, issues induced by the oscillators emerge one after another. For example, using multiple crystal oscillators will make the portable electronic device unable to have a delicate profile/size. For another example, employing a high-precision voltage-controlled oscillator (VCO) will lead to dramatically increased production cost. Therefore, there is a need for a novel approach to implement an electronic device equipped with USB ports under the premise of avoiding the use of oscillators that may hinder designers to reduce production cost or product size.

SUMMARY OF THE INVENTION

Therefore, one of the objectives of the present invention is to provide a method for performing clock extraction and related apparatus thereof to solve the aforementioned issues.

Another one of the objectives of the present invention is to provide a method for performing clock extraction and related apparatus thereof, so as to implement electronic devices equipped with USB ports (such as a USB mass storage device) without using any high-precision VCO.

According to a preferred embodiment of the present invention, a method applied in an electronic device for performing clock extraction is disclosed. The method includes: performing edge analysis upon a training sequence equalization (TSEQ) pattern carried by a set of received signals that are received via a Universal Serial Bus (USB) port of an electronic device, to obtain a plurality of estimated edge numbers; generating a plurality of analysis results in accordance with the plurality of estimated edge numbers and a predetermined threshold, wherein the plurality of estimated edge numbers is derived by performing edge number estimation upon the TSEQ pattern, and the edge number estimation corresponds to a plurality of time intervals respectively; and performing frequency calibration on a frequency of an output clock of an oscillator in accordance with the plurality of analysis results, so as to utilize the output clock to act as a reference clock after the frequency calibration is completed.

At the same time, an apparatus for performing clock extraction is also provided correspondingly, wherein the apparatus includes at least a portion of an electronic device. The apparatus includes an edge analysis circuit and a reference clock generator. The edge analysis circuit is arranged for performing edge analysis upon a training sequence equalization (TSEQ) pattern carried by a set of received signals that are received via a Universal Serial Bus (USB) port of an electronic device, to obtain a plurality of estimated edge numbers, and generating a plurality of analysis results in accordance with the plurality of estimated edge numbers and a predetermined threshold, wherein the plurality of estimated edge numbers is derived by performing the edge number estimation upon the TSEQ pattern, and the edge number estimation corresponds to a plurality of time intervals respectively. The reference clock generator is coupled to the edge analysis circuit and is arranged for generating a reference clock, wherein the reference clock generator includes an oscillator and a frequency calibration unit. The oscillator is arranged for generating an output clock. The frequency calibration unit is coupled to the edge analysis circuit and the oscillator, and is arranged for performing frequency calibration upon frequency of an output clock of an oscillator in accordance with the plurality of analysis results, so as to utilize the output clock to act as a reference clock after the frequency calibration is completed. More particularly, the oscillator may be a numerically controlled oscillator (NCO).

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating an edge analysis associated with the method shown in FIG. 2.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
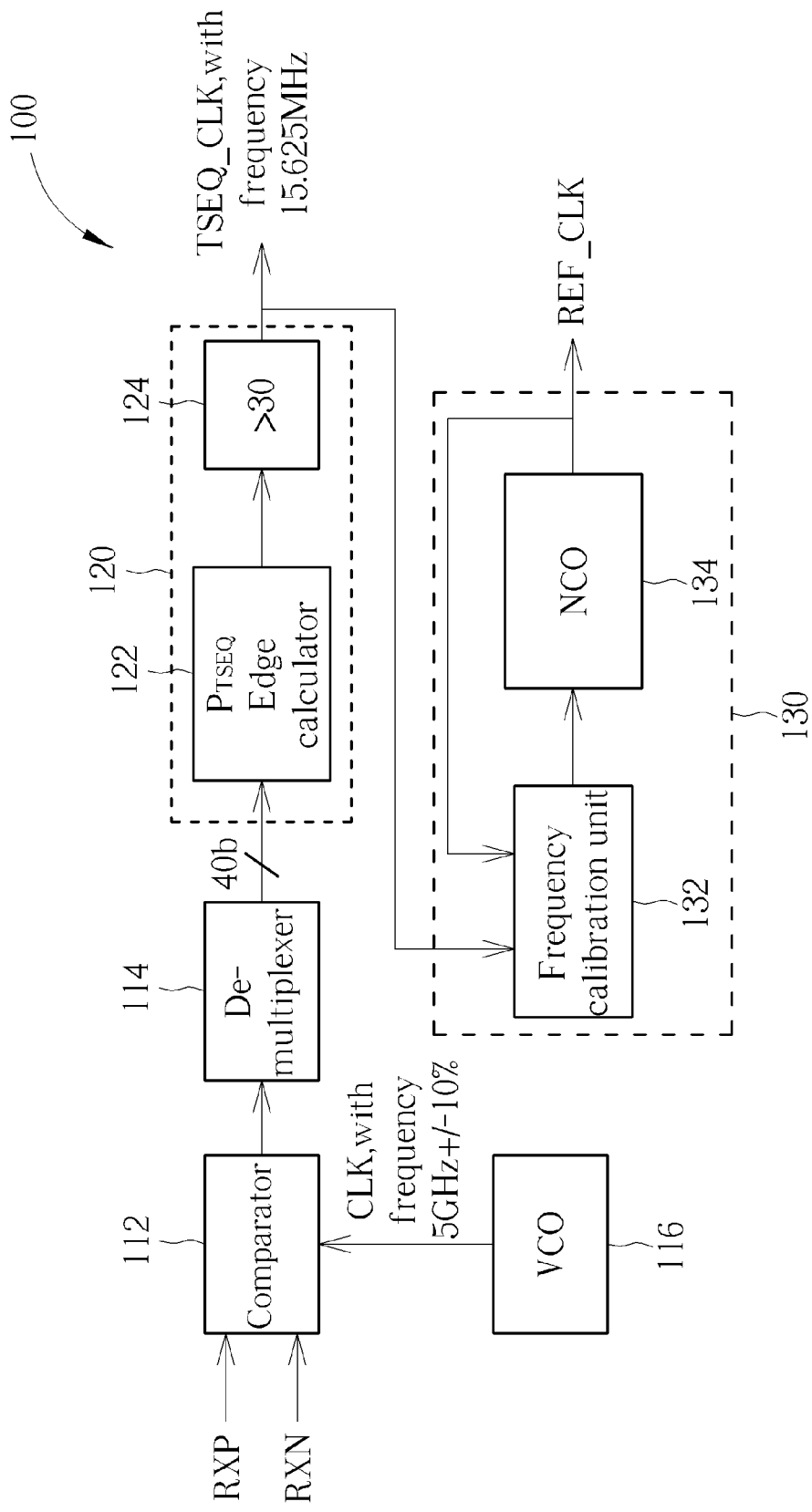
FIG. 1 is a diagram illustrating an apparatus for performing clock extraction according to a first embodiment of the present invention.

FIG. 1 is a diagram illustrating an apparatus 100 for performing clock extraction according to a first embodiment of the present invention. The apparatus 100 includes at least a portion (i.e., part or all) of an electronic device, wherein the electronic device may be a flash disk, an external hard drive, a memory card reader complying with one or more standards. For instance, the apparatus 100 may include a portion of the electronic device, such as a control circuit of the electronic apparatus. For another example, the apparatus 100 may include all the electronic device, i.e. the whole electronic device. In accordance with this embodiment, the electronic complies with USB 3.0 standard or derivative versions of the USB 3.0 standard.

As shown in FIG. 1, the apparatus 100 includes a comparator 112, a de-multiplexer 114, a voltage controlled oscillator (VCO) 116, an edge analysis circuit 120, and a reference clock generator 130, wherein the edge analysis circuit 120 includes a training sequence equalization (TSEQ) pattern edge calculator 122 (which is denoted as $P_{TSEQ}$ edge calculator in FIG. 1) and a comparator unit 124 (which is denoted as >30 in FIG. 1, where >30 represents a comparison process for comparing the input signal value with a predetermined threshold of 30). The reference clock generator 130 includes a frequency calibration unit 132 and an oscillator such as a numerically controlled oscillator (NCO) 134. The apparatus 100 may use the comparator 112 to receive a set of received signals RXP and RXN via a USB port of the electronic device, and obtain a reference clock REF_CLK from the information carried by the set of received signals RXP and RXN in the absence of any high-precision VCO.

According to the embodiment, the edge analysis circuit 120 is utilized for performing edge analysis upon a TSEQ pattern $P_{TSEQ}$ carried by the set of received signals RXP and RXN received by the USB port of the electronic device, to thereby obtain a plurality of estimated edge numbers, each being an estimated number of edges. Then, a plurality of analysis result is generated dynamically based on the estimated edge numbers and a predetermined threshold (e.g. 30), wherein the estimated edge numbers are derived by performing edge number estimation, respectively corresponding to a plurality of time intervals, upon the TSEQ pattern. Further, the reference clock generator 130 is utilized to generate the reference clock REF_CLK. In addition, the NCO 134 is utilized to generate an output clock, and the frequency calibration unit 132 is utilized to perform frequency calibration upon the frequency of the output clock of the NCO 134 in accordance with the frequency of alternate occurrence of different types of analysis results among the plurality of analysis results, so as to use the output clock to act as the reference clock REF_CLK after the frequency calibration is completed. In practice, the output clocks of the reference clock REF_CLK and the NCO 134 may be the same signal, wherein under the control of a micro processor (not shown in FIG. 1), the apparatus 100 may start to employ the reference clock REF_CLK after the frequency calibration process is done, so as to prevent the un-calibrated frequency of the reference clock REF_CLK from being used before the completion of the frequency calibration. Therefore, the output clocks of the reference clock REF_CLK and the NCO 134 are jointly marked as REF_CLK in FIG. 1 for brevity.

Please note that, in the electronic device, there does not exist any VCO with accuracy corresponding to a frequency offset ratio less than 10%. This also means that each VCO employed in the electronic device of the present invention has a frequency offset ratio higher than 10%. For example, the frequency of the clock CLK of the VCO 116 is approximately 5 GHz, and more particularly, falls in the range between (5 GHz)*(1−10%) and (5 GHz)*(1+10%); besides, the corresponding frequency offset ration is 10%. By using the architecture shown in FIG. 1, the apparatus 100 is capable of accurately deriving the frequency of 15.625 MHz from the information carried by the set of the received signals RXP and RXN, such as the TSEQ pattern $P_{TSEQ}$, in a situation where the phase of the set of the received signals RXP and RXN has not been locked, so as to generate the reference clock REF_CLK with the frequency of 15.625 MHz for the apparatus 100 to perform at least a portion (i.e., part or all) of a series of preparatory operations for clock and data recovery. Therefore, any high-precision VCO is unnecessary for the architecture, such as a VCO with accuracy corresponding to a frequency offset ratio less than 10%. For instance, the series of preparatory operations may include: the apparatus 100 performs phase and frequency detection to lock the frequency of the set of received signals RXP and RXN; and the apparatus 100 further performs phase detection to lock the phase of the set of received signals RXP and RXN after the frequency of the set of received signals RXP and RXN is locked, wherein after the phase of the set of received signals RXP and RXN is locked, the apparatus 100 is capable of deriving data carried by the set of received signals RXP and RXN correctly. Regarding more details of the operation of the apparatus 100, please refer to FIG. 2 for further descriptions.

Figure 2:
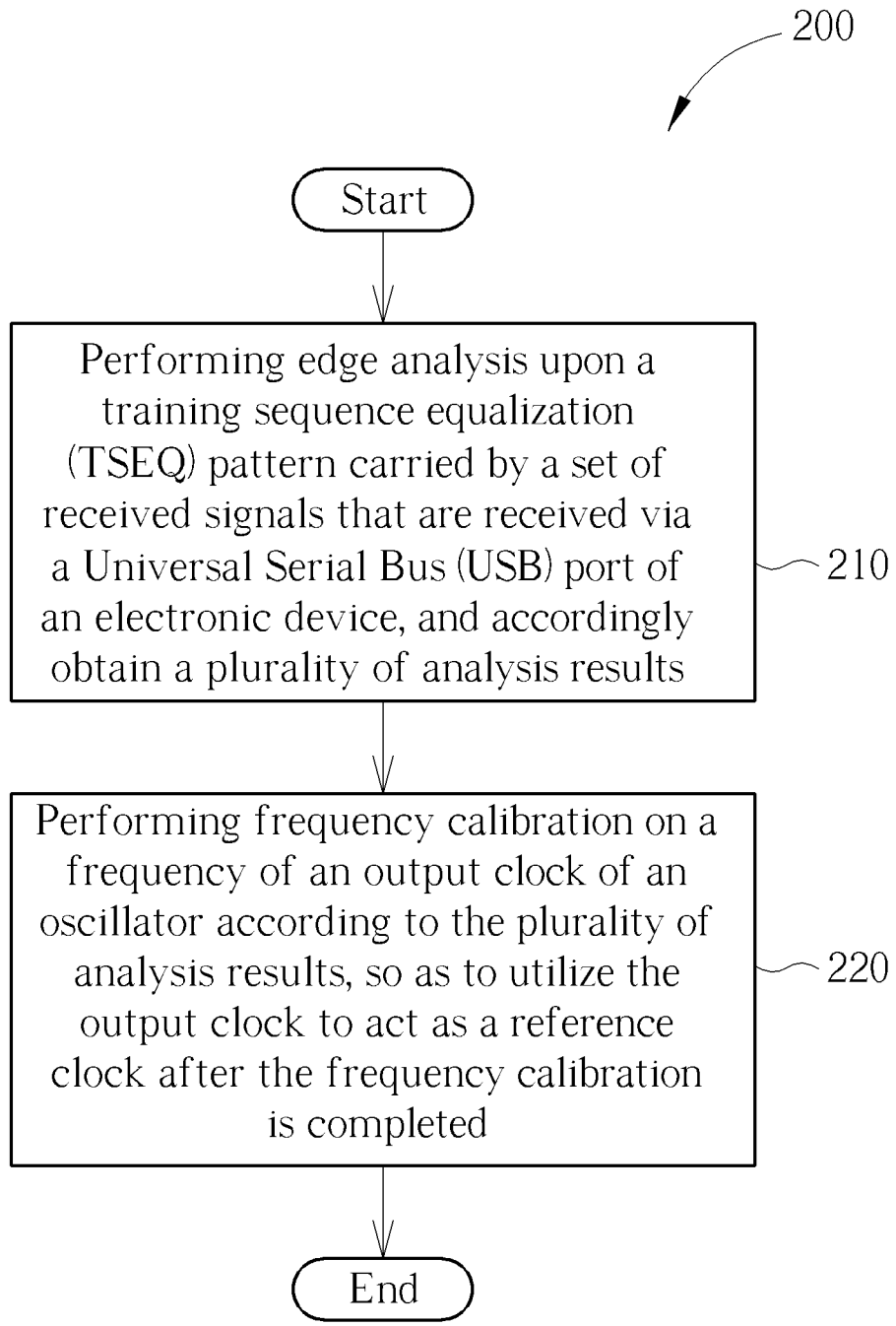
FIG. 2 is a flowchart illustrating a method for performing clock extraction according to an embodiment of the present invention.

FIG. 2 is a flowchart illustrating a method 200 for performing clock extraction according to an embodiment of the present invention. The method 200 can be applied to the apparatus 100 shown in FIG. 1, and the descriptions for the method 200 are as follows.

In step 210, the edge analysis circuit 120 performs edge analysis upon a TSEQ pattern carried by a set of received signals, such as the TSEQ pattern $P_{TSEQ}$ carried by the set of received signals RXP and RXN, received via the USB port of the electronic device, so as to generate a plurality of analysis results dynamically. More particularly, the edge analysis circuit 120 performs edge analysis upon the TSEQ pattern $P_{TSEQ}$ carried by the set of received signals RXP and RXN to derive a plurality of estimated edge numbers. Moreover, the edge analysis circuit 120 dynamically generates a plurality of analysis results based on the estimated edge numbers and a predetermined threshold such as the afore-mentioned threshold (e.g., 30 or a positive integer close to 30), wherein the estimated edge numbers are derived by performing edge number estimation, corresponding to a plurality of time intervals respectively, upon the TSEQ pattern.

In step 220, the frequency calibration unit 132 performs the above-mentioned frequency calibration upon the frequency of the output clock of the NCO 134 based on the frequency of alternate occurrence of different levels of the comparison signal (which represents the frequency of alternate occurrence of different types of analysis results among the plurality of analysis results), so as to utilize the output clock to act as the reference clock REF_CLK after the frequency calibration is completed.

In accordance with this embodiment, the comparator 112 compares the received signals RXP and RXN with each other to generate a non-differential received signal corresponding to the set of received signals RXP and RXN. The de-multiplexer 114 performs de-multiplexing operation upon the non-differential received signal to generate a set of de-multiplexed signals corresponding to a plurality of bits respectively, wherein the order of the plurality of bits corresponds to the order of original data in the non-differential received signal before de-multiplexing. For instance, the set of de-multiplexed signals may be 40 de-multiplexed signals corresponding to 40 bits {B0, B1, . . . , B39} respectively. Such 40-bit parallel transmission signal is denoted as 40b in FIG. 1 for brevity. Please note that bit information, such as the above-mentioned 40 bits {B0, B1, . . . , B39}, is carried by the set of received signals RXP and RXN, and can be de-multiplexed by the de-multiplexer 114 to generate de-multiplexed signal {D0, D1, . . . , D39}. After that, the de-multiplexed signal {D0, D1, . . . , D39} can be transmitted to the TSEQ pattern edge calculator 122 in parallel. In addition, the TSEQ pattern edge calculator 122 performs the aforementioned edge analysis by comparing respective voltage levels of the de-multiplexed signals corresponding to every two neighboring bits of the bits (such as the 40 bits {B0, B1, . . . , B39}) with each other. The advantage of de-multiplexing the received signals RXP and RXN to generate de-multiplexed signals {D0, D1, . . . , D39} is lowering the operating frequency of the following circuits to thereby reduce the complexity of the following circuits.

Please note that FIG. 2 illustrates the working flows of step 210 and step 220 for illustrative purposes only, not a limitation of the present invention. The working flows may be modified in accordance with other alternative designs of this embodiment. For instance, at least a portion of the operation of step 210 and/or at least a portion of the operation of step 220 may be executed repeatedly. For another example, at least a portion of the operation of step 210 and at least a portion of the operation of step 220 may be executed simultaneously.

Please refer to FIG. 3, which is a diagram illustrating an edge analysis associated with the method 200 shown in FIG. 2. When the edge analysis circuit 120 performs the edge analysis, the TSEQ pattern edge calculator 122 therein generates estimated edge numbers Edge_No corresponding to different time intervals for the TSEQ pattern $P_{TSEQ}$ in accordance with the respective voltage levels of the de-multiplexed signals corresponding to every two neighboring bits of the plurality of bits (such as the 40 bits {B0, B1, . . . , B39}), for generating the analysis results. For instance, in the ideal case, supposing the logic values of the TSEQ pattern $P_{TSEQ}$ is the content shown in FIG. 3, i.e. {{0011111010}, {0101001110}, {0001011011}, {0110000110}}, {{0010111011}, {0100111010}, {0001110001}, {1011010100}}, . . . , {{0101010101}, {0101010101}, {0101010101}, {0101010101}} that is, each bit row starting from the top left, from left to right, and from top to bottom). The TSEQ pattern edge calculator 122 can generate the estimated edge numbers Edge_No, such as {20, 22, 20, 26, 39, 39, 39, 39, 21, . . . , 39}, corresponding to different time intervals respectively, wherein any bit row among the aforementioned bit rows can be regarded as an example of the above-mentioned 40 bits {B0, B1, . . . , B39}. Therefore, the comparator unit 124 compares the estimated edge numbers Edge_No with the predetermined threshold, such as the aforementioned predetermined value 30, sequentially to generate a comparison signal that carries the analysis results, wherein the frequency of alternate occurrence of different levels of the comparison signal represents the frequency of alternate occurrence of different types of analysis results among the plurality of analysis results, and according to the USB 3.0 standard, the frequency should be a constant and thus can be utilized to generate the reference clock REF_CLK.

In practice, the comparison signal may be a clock TSEQ_CLK shown in FIG. 1, which may stay at a high voltage level or a low voltage level. For instance, the high voltage level may be used to indicate that the estimated edge number Edge_No exceeds the predetermined threshold; on the other hand, the low voltage level may be used to indicate that the estimated edge number Edge_No drops below or equal the predetermined threshold. However, this is for illustrative purpose only, not a limitation of the present invention. According to an alternative design of the present invention, the low voltage level may be used to indicate that the estimated edge number Edge_No exceeds the predetermined threshold; on the other hand, the high voltage level may be used to indicate that the estimated edge number Edge_No drops below or equal the predetermined threshold.

As shown in FIG. 3, based on the comparison operation disclosed above, two analysis results Edge_Density corresponding to the edge density may be included in the analysis results, such as one analysis result corresponding to an edge density 50% and another analysis result corresponding to an edge density 100%, wherein the former and the latter may be represented by the low voltage level and the high voltage level respectively. Therefore, in a situation where the TSEQ patter $P_{TSEQ}$ complies with the USB 3.0 standard, the frequency of alternate occurrence of different levels of the clock TSEQ_CLK approaches 15.625 MHz. Thus, the apparatus 100 can perform the aforementioned frequency calibration in accordance with the frequency of alternate occurrence of different levels of the clock TSEQ_CLK, so as to generate the reference clock REF_CLK correctly. However, this is for illustrative purpose only, not a limitation of the present invention. According to some alternative designs of the embodiment shown in FIG. 3, the edge analysis circuit 120 may calculate the edge density corresponding to each of the estimated edge numbers Edge_No in advance (e.g., edge densities of the estimated edge numbers {20, 22, 20, 26, 39, 39, 39, 39, 21, . . . , 39} shown in FIG. 3), such as the edge densities {20/40, 22/40, 20/40, 26/40, 39/40, 39/40, 39/40, 39/40, 21/40, . . . , 39/40}, i.e., {50%, 55%, 50%, 65%, 97.5%, 97.5%, 97.5%, 97.5%, 52.5%, . . . , 97.5%}). In addition, the edge analysis circuit 120 may compare the edge densities such as {50%, 55%, 50%, 65%, 97.5%, 97.5%, 97.5%, 97.5%, 52.5%, . . . , 97.5%} with another predetermined threshold (e.g., 75% or a positive integer close to 75%) sequentially, so as to generate the analysis results, wherein the another predetermined threshold corresponds to the predetermined threshold mentioned in the embodiment shown in FIG. 2. For instance, in a situation where the predetermined threshold mentioned in the embodiment shown in FIG. 2 is 30, the another predetermined threshold may be 30/40, i.e. 75%. It should be noted that, as long as implementation of the preset invention is not affected, the denominator 40 employed above for edge density calculation may be modified.

Figure 4:
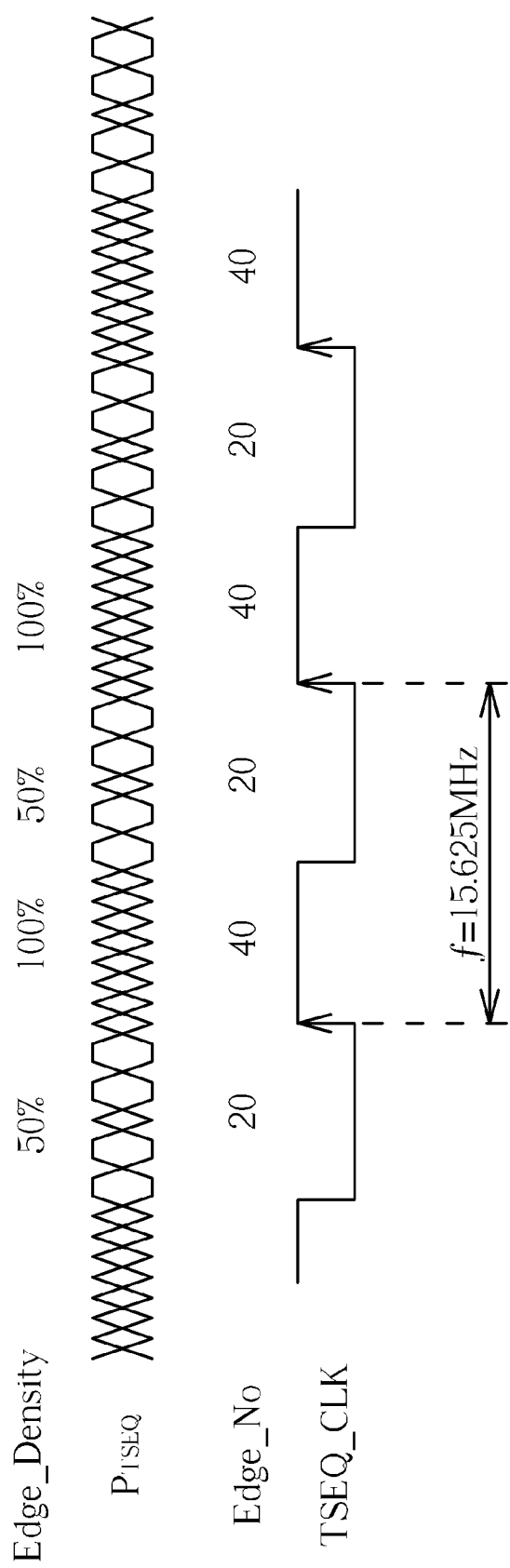
FIG. 4 is a diagram illustrating parameters and signals associated with the method shown in FIG. 2.

FIG. 4 is a diagram illustrating parameters and signals associated with the method 200 shown in FIG. 2. As shown in FIG. 4, the estimated edge number Edge_No and the analysis result Edge_Density corresponding to the edge density may be included in the aforementioned parameters, and the clock TSEQ_CLK and the set of received signals RXP and RXN carrying the TSEQ pattern $P_{TSEQ}$ are included in the above-mentioned signals, wherein the latter is indicated as $P_{TSEQ}$ to emphasize that the TSEQ pattern $P_{TSEQ}$ is carried by the set of received signals RXP and RXN.

Please note that, in the ideal case, the analysis results correspond to a series of edge densities of the TSEQ pattern $P_{TSEQ}$ precisely. In practice, although the estimated edge number Edge_No may have some errors, the errors can be reduced by appropriately choosing the threshold of the comparator unit 124, so as to ensure the errors to be insufficient to induce inversed phase of the clock TSEQ_CLK abnormally, and prevent the aforementioned frequency calibration form being obstructed.

Figure 5:
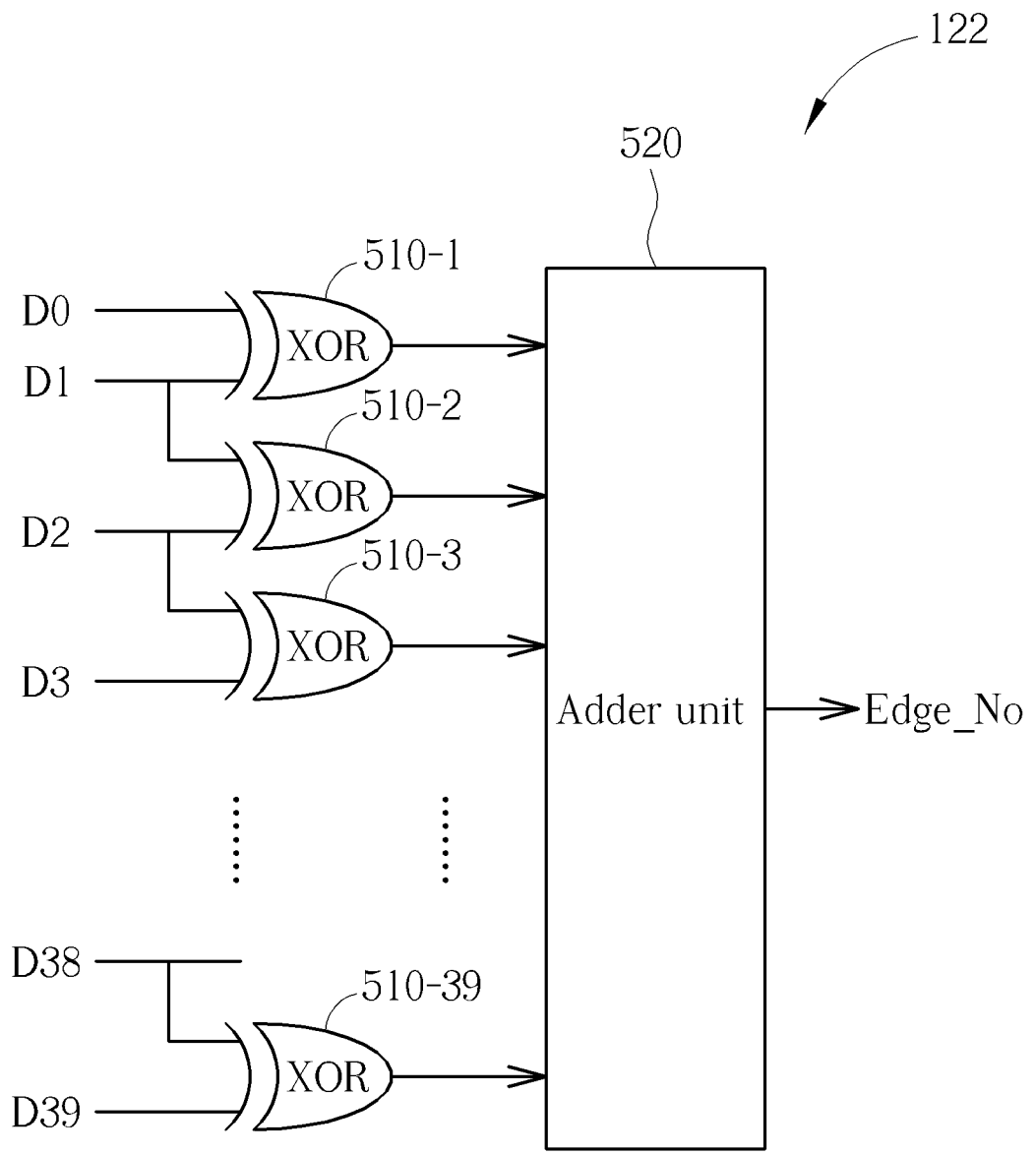
FIG. 5 is a diagram illustrating associated implementation details of the TSEQ pattern edge calculator shown in FIG. 1.

FIG. 5 is a diagram illustrating associated implementation details of the TSEQ pattern edge calculator 122 shown in FIG. 1, wherein the notations {D0, D1, D2, D3, . . . , D38, D39} are representative of the de-multiplexer signals. The TSEQ pattern edge calculator 122 includes a plurality of Exclusive OR (XOR) arithmetic units {510-1, 510-2, 510-3, . . . , 510-39} coupled to the de-multiplexer 114 and an adder unit 520. According to this embodiment, the de-multiplexed signals {D0, D1, . . . , D39} may act as an example of the above-mentioned forty de-multiplexed signals.

As shown in FIG. 5, the XOR arithmetic units {510-1, 510-2, 510-3, . . . , 510-39} can repeatedly perform XOR operations upon the respective voltage levels of the de-multiplexed signals {D0, D1, . . . , D39} corresponding to two neighboring bits, so as to generate multiple sets of XOR operation results corresponding to different time points respectively. The adder unit 520 can calculate the sum of each set of XOR operation results, and utilize the sums respectively corresponding to the time points to act as the estimated edge numbers Edge_No corresponding to different time intervals for the TSEQ pattern $P_{TSEQ}$, thereby generating the plurality of analysis results. For instance, in a situation where the logic values of the de-multiplexed signals {D0, D1, ..., D39} equal to the first bit row {{0011111010}, {0101001110}, {0001011011}, {0110000110}} of the TSEQ pattern $P_{TSEQ}$, the estimated edge number Edge_No generated by the architecture shown in FIG. 5 is equal to 20. For another example, in a situation where the logic values of the de-multiplexed signals {D0, D1, . . . , D39} equal to the last bit row {{0101010101}, {0101010101}, {0101010101}, {0101010101}} of the TSEQ pattern $P_{TSEQ}$, the estimated edge number Edge_No generated by the architecture shown in FIG. 5 is equal to 39.

Figure 6:
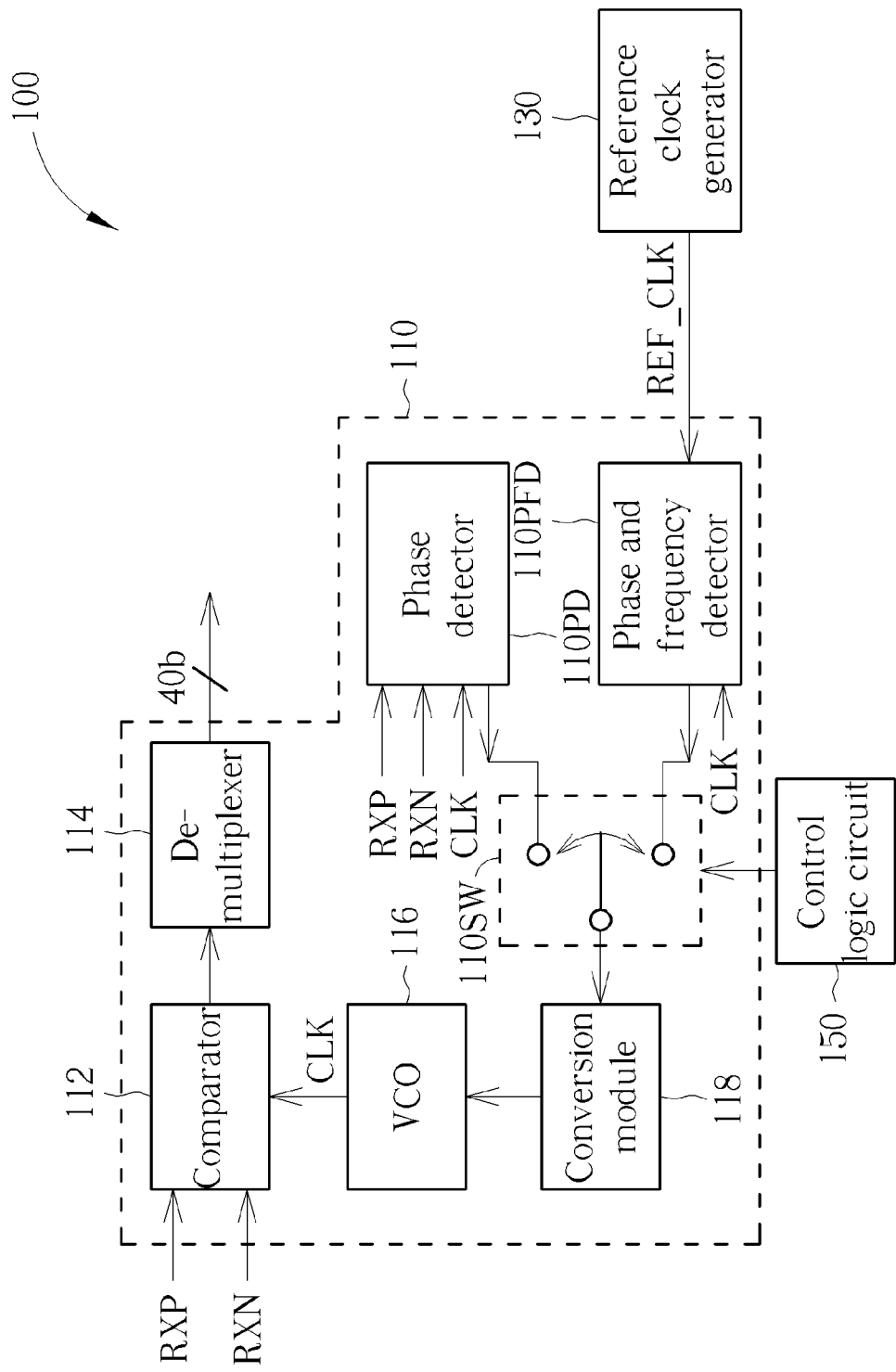
FIG. 6 is a diagram illustrating implementation details associated with the method shown in FIG. 2.

FIG. 6 is a diagram illustrating implementation details associated with the method 200 shown in FIG. 2. As shown in FIG. 6, the apparatus 100 includes a clock and data recovery (CDR) circuit 110 and a control logic circuit 150. Besides the comparator 112, de-multiplexer 114, and the VCO 116 shown in FIG. 1, the CDR circuit 110 may further include a conversion module 118, a switching unit 110SW, a phase and frequency detector 110PFD, and a phase detector 110PD.

According to this embodiment, the control logic circuit 150 controls the switching unit 110SW to perform switching process, so as to provide one of a first detection signal outputted from the phase and frequency detector 110PFD and a second detection signal outputted from the phase detector 110PD to the conversion module 118. In addition, the conversion module 118 adjusts the input voltage level of the VCO 116 according to the first detection signal or the second detection signal received by the switching unit 110SW, so as to control the frequency of the clock CLK. In practice, a charge pump (not shown) and associated control circuit may be employed in the conversion module 118 to generate the input voltage level of the VCO 116.

First of all, in a situation where the switching unit 110SW provides the first detection signal to the conversion module 118, the phase and frequency detector 110PFD performs the phase and frequency detection based on the reference clock REF_CLK and clock CLK to generate the first detection signal. Therefore, by utilizing the architecture shown in FIG. 1, the apparatus 100 locks the frequency of the set of received signals RXP and RXN. After the apparatus 100 has locked the set of received signals RXP and RXN, the control logic circuit 150 controls the switching of the switching unit 110SW to receive the second detection signal. In a situation where the switching unit 110SW provides the second detection signal to the conversion module 118, the phase and frequency detector 110PFD performs the phase and frequency detection based on the reference clock REF_CLK and clock CLK to generate the second detection signal. Therefore, the CDR circuit 110 locks the phase of the set of received signals RXP and RXN. In this case, since the frequency and phase of the clock CLK coincide with the frequency and phase of the set of received signals RXP and RXN respectively, the apparatus 100 can utilize the CDR circuit 110 to derive data carried by the set of received signals RXP and RXN correctly after the phase of the set of received signals RXP and RXN has been locked.

Based on each of the embodiments mentioned above, the reference clock generator 130 is capable of performing the frequency calibration upon the frequency of the output clock of the NCO 134 according to the frequency of alternate occurrence of different types of analysis results among the plurality of analysis results, and the apparatus 100 therefore can employ the output clock as the reference clock REF_CLK after the frequency calibration is completed. In this way, once the frequency calibration has completed, it is unnecessary for the CDR circuit 110 to lock the phase of the set of received signals RXP and RXN in advance. More particularly, instead of needing to lock the phase of the set of received signals in advance for some conventional electronic devices, the CDR circuit 100 has not locked the phase of the set of received signals when the frequency calibration has completed. Hence, the disclosed method and apparatus prevent users from unnecessary waiting.

Please note that the output clock is utilized to act as the reference clock REF_CLK of the apparatus after the completion of the frequency calibration. In this way, the CDR circuit 110 is able to perform at least a portion (e.g., part or all) of the above-mentioned series of preparatory operations. Due to the result of the series preparatory operations, the apparatus 100 utilizes the CDR circuit 110 to lock frequency and phase of the set of received signals RXP and RXN, and then further derives data carried by the set of received signals RXP and RXN correctly.

One of the advantages of the present invention is that the reference clock generator 130 is able to perform the frequency calibration upon the frequency of the output clock of the NCO 134 of alternate occurrence of different types of analysis results among the plurality of analysis results, so as to allow the apparatus 100 to use the output clock to act as the reference clock REF_CLK after the frequency calibration is completed. In this way, the electronic device is not required to use any VCO with accuracy corresponding to a frequency offset ratio less than 10%. Since high-precision VCO is unnecessary, the production cost will be reduced. Furthermore, since multiple crystal oscillators are also unnecessary, the production cost will be further reduced. Moreover, electronic devices designed based on the method and apparatus disclosed in the present invention have delicate profile/size due to the above-mentioned reasons.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method applied to an electronic device for performing clock extraction, comprising:
   performing edge analysis upon a training sequence equalization (TSEQ) pattern carried by a set of received signals that are received via a Universal Serial Bus (USB) port of the electronic device, and accordingly obtain a plurality of estimated edge numbers;
   generating a plurality of analysis results according to the plurality of estimated edge numbers and a predetermined threshold, wherein the plurality of estimated edge numbers are derived by performing edge number estimation upon the TSEQ pattern corresponding to a plurality of time intervals respectively; and performing frequency calibration on a frequency of an output clock of an oscillator according to the plurality of analysis results, so as to utilize the output clock to act as a reference clock after the frequency calibration is completed.

2. The method of claim 1, further comprising:

comparing the received signals with each other to generate a non-differential received signal corresponding to the set of received signals; and performing de-multiplexing operation upon the non-differential received signal to generate a set of de-multiplexed signals corresponding to a plurality of bits respectively, wherein an order of the plurality of bits corresponds to an order of original data in the non-differential received signal before de-multiplexing;

wherein the step of performing the edge analysis upon the TSEQ pattern carried by the set of received signals that are received via the USB port of the electronic device, to obtain the plurality of estimated edge numbers further comprises:

performing the edge analysis by comparing respective voltage levels of de-multiplexed signals corresponding to every two neighboring bits of the plurality of bits with each other.

3. The method of claim 2, wherein the step of performing the edge analysis upon the TSEQ pattern carried by the set of received signals that are received via the USB port of the electronic device, to obtain the plurality of estimated edge numbers further comprises:

performing Exclusive OR (XOR) operation repeatedly upon the respective voltage levels of the de-multiplexed signals corresponding to every two neighboring bits of the plurality of bits, to generate a plurality of sets of XOR operation results corresponding to different time points respectively; and calculating a sum of each set of XOR operation results and utilizing sums respectively corresponding to the time points to act as the estimated edge numbers corresponding to the different time intervals for the TSEQ pattern, for generation of the plurality of analysis results.

4. The method of claim 3, wherein the step of generating the plurality of analysis results according to the plurality of estimated edge numbers and the predetermined threshold further comprises:

comparing the estimated edge numbers with the predetermined threshold sequentially, to generate a comparison signal that carries the plurality of analysis results, wherein a frequency of alternate occurrence of different levels of the comparison signal represents the frequency of alternate occurrence of different types of analysis results among the plurality of analysis results, and the frequency of alternate occurrence of different types of analysis results is utilized for performing the frequency calibration upon the frequency of the output clock of the oscillator.

5. The method of claim 2, wherein the step of performing the edge analysis upon the TSEQ pattern carried by the set of received signals that are received via the USB port of the electronic device, to obtain the plurality of estimated edge numbers further comprises:

generating estimated value of edge number corresponding to different time intervals for the TSEQ pattern according to the respective voltage levels of the de-multiplexed signals corresponding to every two neighboring bits of the plurality of bits, for generating the plurality of analysis results;

wherein the step of generating the plurality of analysis results according to the plurality of estimated edge numbers and the predetermined threshold further comprises:

comparing the estimated edge numbers with the predetermined threshold sequentially, to generate a comparison signal that carries the plurality of analysis results, wherein the frequency of alternate occurrence of different levels of the comparison signal represents the frequency of alternate occurrence of different types of analysis results among the plurality of analysis results, and the frequency of alternate occurrence of different types of analysis results is utilized for performing the frequency calibration upon the frequency of the output clock of the oscillator.

6. The method of claim 1, further comprising:

calculating edge densities corresponding to the plurality of estimated edge numbers respectively; and comparing the edge densities with the predetermined threshold sequentially, to generate the plurality of analysis results.

7. The method of claim 1, wherein a clock and data recovery (CDR) circuit of the electronic device does not lock phase of the set of received signals yet when the frequency calibration is completed.

8. The method of claim 1, further comprising:

after the frequency calibration is completed, utilizing the output clock to act as the reference clock such that a clock and data recovery (CDR) circuit of the electronic device does not need to lock the phase of the set of received signal when the frequency calibration is completed.

9. The method of claim 1, wherein in the electronic device, there is no voltage controlled oscillator (VCO) with accuracy corresponding to a frequency offset ratio less than 10%.

10. The method of claim 1, further comprising:

after the frequency calibration is completed, utilizing the output clock to act as the reference clock such that the electronic device does not need to be equipped with any VCO with accuracy corresponding to a frequency offset ratio less than 10%.

11. An apparatus for performing clock extraction, the apparatus including at least a portion of an electronic device, the apparatus comprising:

an edge analysis circuit, arranged for performing edge analysis upon a training sequence equalization (TSEQ) pattern carried by a set of received signals that are received via a Universal Serial Bus (USB) port of an electronic device to obtain a plurality of estimated edge numbers, and generating a plurality of analysis results according to the plurality of estimated edge numbers and a predetermined threshold, wherein the plurality of estimated edge numbers is derived by performing edge number estimation upon the TSEQ pattern, and the edge number estimation corresponds to a plurality of time intervals respectively; and a reference clock generator, coupled to the edge analysis circuit, the reference clock generator arranged for generating a reference clock, wherein the reference clock generator comprises:

an oscillator, arranged for generating an output clock; and a frequency calibration unit, coupled to the edge analysis circuit and the oscillator, the frequency calibration unit arranged for performing frequency calibration on a frequency of the output clock of the oscillator according to the plurality of analysis results, wherein the output clock is utilized to act as a reference clock after the frequency calibration is completed.

12. The apparatus of claim 11, further comprising:
a comparator, coupled to the USB port, the comparator arranged for comparing the received signals with each other to generate a non-differential received signal corresponding to the set of received signals; and
a de-multiplexer, coupled to the comparator, the de-multiplexer arranged for performing de-multiplexing operation upon the non-differential received signal to generate a set of de-multiplexed signals corresponding to a plurality of bits respectively, wherein an order of the plurality of bits corresponds to an order of original data in the non-differential received signal before de-multiplexing;
wherein the edge analysis circuit comprises:
a TSEQ pattern edge calculator, coupled to the de-multiplexer, the TSEQ pattern edge calculator arranged for performing the edge analysis by comparing respective voltage levels of the de-multiplexed signals corresponding to every two neighboring bits of the plurality of bits with each other.

13. The apparatus of claim 12, wherein the TSEQ pattern edge calculator comprises:
a plurality of Exclusive OR (XOR) arithmetic units, coupled to the de-multiplexer, the plurality of XOR arithmetic units arranged for performing XOR operation repeatedly upon the respective voltage levels of the de-multiplexed signals corresponding to every two neighboring bits of the plurality of bits, to generate a plurality of sets of XOR operation results corresponding to the different time points respectively; and
an adder unit, coupled to the plurality of XOR arithmetic units, the adder unit arranged for calculating a sum of each set of XOR operation results and utilizing sums respectively corresponding to the time points to act as the estimated edge numbers corresponding to the different time intervals for the TSEQ pattern, for generation of the plurality of analysis results.

14. The apparatus of claim 13, wherein the edge analysis circuit further comprises:
a comparator unit, coupled to the TSEQ pattern edge calculator, the comparator unit arranged for comparing the estimated edge numbers with the predetermined threshold sequentially to generate a comparison signal that carries the plurality of analysis results, wherein a frequency of alternate occurrence of different levels of the comparison signal represents the frequency of alternate occurrence of different types of analysis results among the plurality of analysis results, and the frequency of alternate occurrence of different types of analysis results is utilized for performing the frequency calibration upon the frequency of the output clock of the oscillator.

15. The apparatus of claim 12, wherein when the edge analysis circuit performs the edge analysis, the TSEQ pattern edge calculator therein generates estimated edge numbers corresponding to the different time intervals for the TSEQ pattern according to the respective voltage levels of the de-multiplexed signals corresponding to every two neighboring bits of the plurality of bits, for generation of the plurality of analysis results; and the edge analysis circuit further comprises:
a comparator unit, coupled to the TSEQ pattern edge calculator, the comparator unit arranged for comparing the estimated edge numbers with the predetermined threshold sequentially to generate a comparison signal that carries the plurality of analysis results, wherein the frequency of alternate occurrence of different levels of the comparison signal represents the frequency of alternate occurrence of different types of analysis results among the plurality of analysis results, and the frequency of alternate occurrence of different types of analysis results is utilized for performing the frequency calibration upon the frequency of the output clock of the oscillator.

16. The apparatus of claim 11, wherein the edge analysis circuit calculates edge densities corresponding to the plurality of estimated edge numbers respectively, and compares the edge densities with the predetermined threshold sequentially to generate the plurality of analysis results.

17. The apparatus of claim 11, wherein a clock and data recovery (CDR) circuit of the electronic device does not lock phase of the set of received signals yet when the frequency calibration is completed.

18. The apparatus of claim 11, wherein after the frequency calibration is completed, the apparatus utilizes the output clock to act as the reference clock such that a clock and data recovery (CDR) circuit of the electronic device does not need to lock the phase of the set of received signal when the frequency calibration is completed.

19. The apparatus of claim 11, wherein in the electronic device, there is no voltage controlled oscillator (VCO) with accuracy corresponding to a frequency offset ratio less than 10%.

20. The apparatus of claim 11, wherein after the frequency calibration is completed, the apparatus utilizes the output clock to act as the reference clock such that the electronic device does not need to be equipped with any VCO with accuracy corresponding to a frequency offset ratio less than 10%.

* * * * *